(12) United States Patent
Salsone et al.

(10) Patent No.: US 9,061,829 B2
(45) Date of Patent: Jun. 23, 2015

(54) CONVEYOR BELT WITH IMPROVED EDGE CONFIGURATION

(71) Applicant: Cambridge International, Inc., Cambridge, MD (US)

(72) Inventors: Frank Salsone, Rockville Centre, NY (US); Thomas O. Perdue, Salisbury, MD (US); George H. Messick, Jr., Cambridge, MD (US)

(73) Assignee: Cambridge International, Inc., Cambridge, MD (US)

(*) Notice: Subject to any disclaimer, the term of this patent is extended or adjusted under 35 U.S.C. 154(b) by 53 days.

(21) Appl. No.: 13/661,921

(22) Filed: Oct. 26, 2012

(65) Prior Publication Data

US 2013/0118867 A1 May 16, 2013

Related U.S. Application Data

(60) Provisional application No. 61/551,827, filed on Oct. 26, 2011, provisional application No. 61/691,062, filed on Aug. 20, 2012.

(51) Int. Cl.
*B65G 17/22* (2006.01)
*B65G 15/30* (2006.01)
*B65G 17/08* (2006.01)

(52) U.S. Cl.
CPC ............. *B65G 15/30* (2013.01); *B65G 17/083* (2013.01); *B65G 17/22* (2013.01)

(58) Field of Classification Search
USPC ............................ 198/848, 791, 781.07, 851
See application file for complete search history.

(56) References Cited

U.S. PATENT DOCUMENTS

| | | | | | |
|---|---|---|---|---|---|
| 3,938,651 | A | * | 2/1976 | Alfred et al. | 198/778 |
| 4,603,776 | A | * | 8/1986 | Olsson | 198/728 |
| 5,228,557 | A | * | 7/1993 | Lago | 198/778 |
| 5,277,301 | A | * | 1/1994 | Fenty | 198/778 |
| 5,280,833 | A | * | 1/1994 | Robin | 198/831 |
| 5,501,319 | A | * | 3/1996 | Larson et al. | 198/778 |
| 5,954,187 | A | * | 9/1999 | Hager | 198/778 |
| 6,796,420 | B2 | * | 9/2004 | Byrne et al. | 198/822 |
| 7,494,005 | B2 | * | 2/2009 | Messick et al. | 198/848 |
| 7,762,388 | B2 | * | 7/2010 | Lago | 198/834 |

* cited by examiner

*Primary Examiner* — Gene Crawford
*Assistant Examiner* — Thomas Randazzo
(74) *Attorney, Agent, or Firm* — Buchanan, Ingersoll & Rooney PC

(57) ABSTRACT

A flat wire conveyor belt having a plurality of spaced tractive rods, a plurality of rows of flat wire wickets transversely disposed with respect to a direction of travel and interconnecting the plurality of spaced tractive rods, a plurality of reinforcing bars, a plurality of belt drive clips, and a plurality of belt hold-down clips. The plurality of reinforcing bars, belt drive clips and belt hold-down clips are disposed on at least one outer edge of the flat wire conveyor belt to reduce fatigue failures on the driven edges of the conveyor belt and thereby improve the edge drive capability thereof.

17 Claims, 18 Drawing Sheets

CONVEYOR BELT WITH IMPROVED EDGE CONFIGURATION

TECHNICAL FIELD

The present disclosure is directed to a conveyor belt, and more particularly to a flat wire conveyor belt having an improved edge configuration for maintaining belt orientation and providing improved positive edge drive capability.

BACKGROUND OF THE DISCLOSURE

The disclosure set forth herein relates to a spindle drive conveyor or chain conveyor, as shown for example in U.S. Pat. No. 5,228,557, the entire contents of which are hereby incorporated by reference. In a chain conveyor, as described therein, the belt is entrained and moved by means of drive units each comprising sprockets or toothed wheels engaging with one or both of the chains of the belt, to cause them to move forward at the desired speed. The toothed wheels generally engage the chain tangentially and/or from underneath, and are arranged in a vertical plane passing through the chain.

With reference to FIG. 1, when a conveyor belt 10 is used in a spindle drive conveyor or similar system, tension is carried on the edge 12 of belt 10 by reinforcing bars 14. The wickets 16 on the belt 10 are for product support, rather than taking a load, and the rods 18 are utilized to hold the components of belt 10 together, and to transmit drive forces to the edge 12 of belt 10.

In a straight run, such as the infeed and discharge areas of a helical system, the outer reinforcing bars 14 have little if any effect on the function of belt 10. Drive sprocket teeth 20 (only one of which is illustrated in FIG. 1) engage rods 18 from therebelow and cause rods 18 to deflect at the sprocket tooth 20, releasing tension from the edge 12 of belt 10. This causes wickets 16, whose purpose is for product support, to now take the tension of the belt 10. The sprocket engagement area 22 of rod 18 takes tension from sprocket 20 and applies it to adjacent wicket areas 24 which can lead to wicket fatigue and breakage at one or more of wicket areas 24 where rod 18 meets wickets 16.

In addition, in curved courses of travel, sprockets carried by vertical shafts (of the spindle drive) positively engage the edge 12 of belt 10 when it is collapsed to drive it through each tier of the helix, or through any other curved turn.

Two areas where a flat wire conveyor belt such as shown in FIG. 1 has the most tension is in the sprocket-engagement area 22 of belt 10 and on the edge 12 of belt 10 where it engages the sprockets of the spindle drive. As described in detail in U.S. Pat. No. 7,494,005 to the present assignee, the entire contents of which are hereby incorporated by reference, providing rows of wickets with variable spaced links improves the ability of the conveyor belt to withstand the tension in the sprocket engagement area 22 without fatigue.

Reinforcing bars 14 on the edge of the conveyor belt, as shown in FIG. 1, are used to bear a substantial tractive load. However, the use of reinforcing bars alone has not been entirely successful in eliminating fatigue failures on the positively driven edge 12 of the conveyor belt.

Accordingly, there exists a need in the marketplace for a conveyor belt having an edge configuration for maintaining belt orientation, providing improved positive edge drive capability, and reducing fatigue failures on the driven edges of the conveyor belt.

SUMMARY

A flat wire conveyor belt comprising a plurality of spaced tractive rods; a plurality of rows of flat wire wickets transversely disposed with respect to a direction of travel and interconnecting said plurality of spaced tractive rods; a plurality of reinforcing bars; a plurality of belt drive clips; and a plurality of belt hold-down clips; wherein said conveyor belt includes opposing first and second outer edges and said plurality of reinforcing bars, belt drive clips and belt hold-down clips are disposed on at least one of the first and second outer edges of the flat wire conveyor belt, said reinforcing bars, belt drive clips and belt hold-down clips thereby strengthening said at least one outer edge for receiving tension during use and reducing fatigue failures on the driven edge of the conveyor belt.

A flat wire conveyor belt with improved edge drive capability comprising a plurality of spaced tractive rods; a plurality of rows of flat wire wickets transversely disposed with respect to a direction of travel and interconnecting said plurality of spaced tractive rods; and a plurality of belt drive clips and/or a plurality of belt hold-down clips; wherein said conveyor belt includes opposing first and second outer edges and said plurality of belt drive clips and/or belt hold-down clips are disposed on at least one of the first and second outer edges of the flat wire conveyor belt.

BRIEF DESCRIPTION OF THE DRAWING FIGURES

These and other objects, features, and advantages of the invention will become more readily apparent to those skilled in the art upon reading the following detailed description, in conjunction with the appended drawings in which.

DETAILED DESCRIPTION

Figure 1:
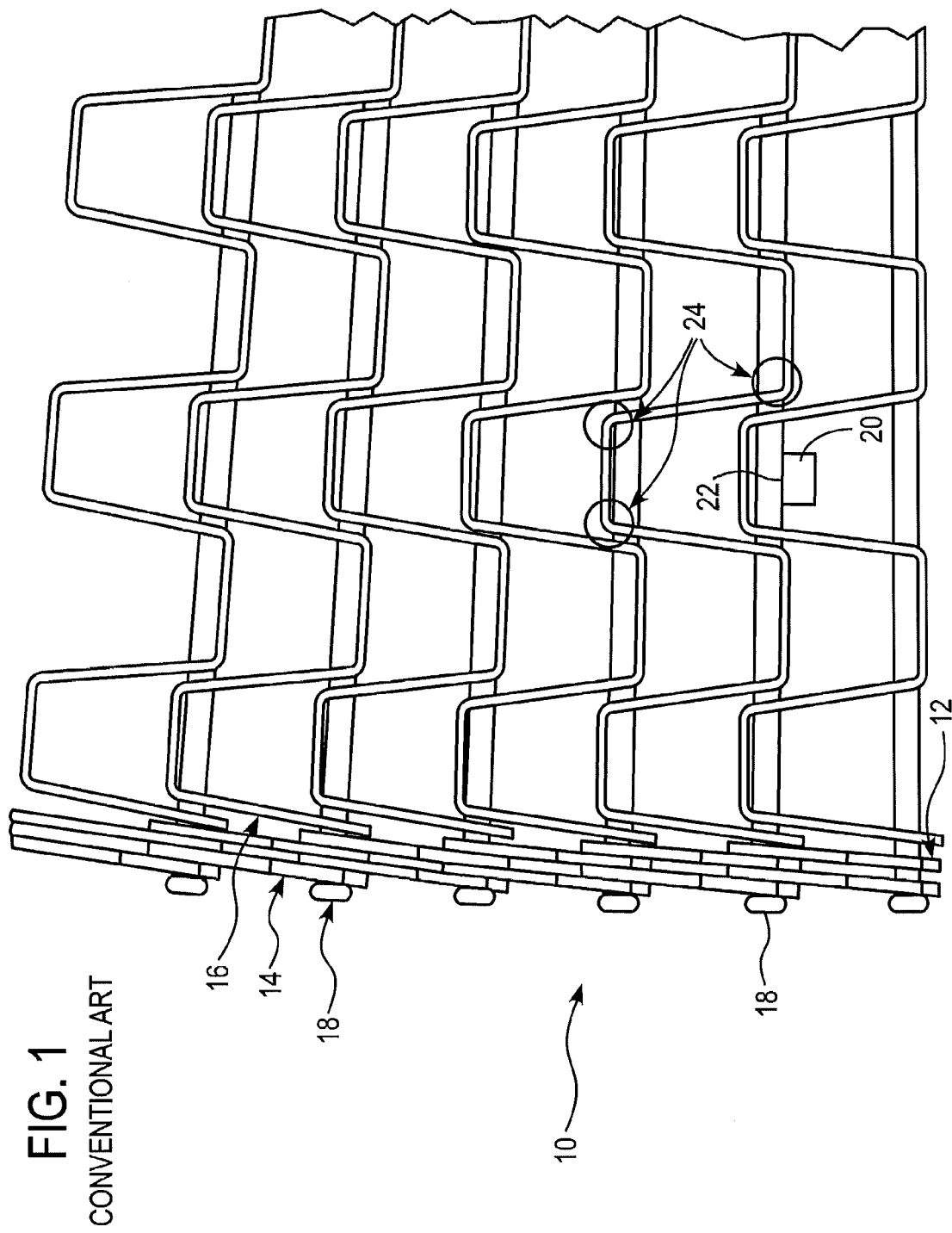
FIG. 1 is a top elevational, partly schematic view with portions broken away, of a segment of a conventional flat-wire conveyor belt.
Figure 2:
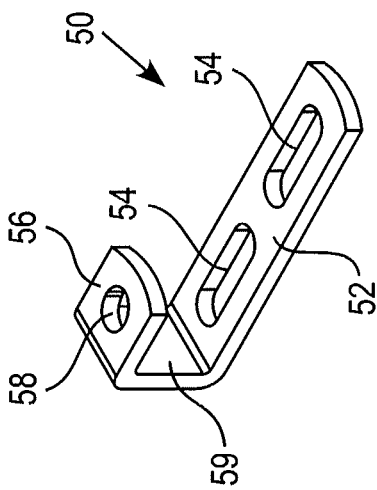
FIG. 2 is a perspective view of a belt drive clip according to a first embodiment of the disclosure.
Figure 5:
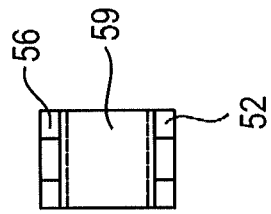
FIG. 5 is a side elevational view thereof.
Figure 3:
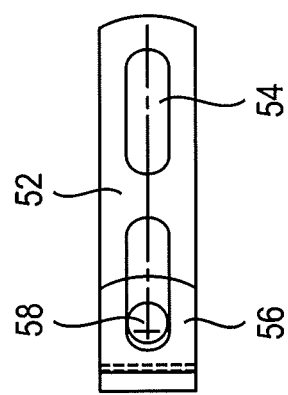
FIG. 3 is a top view thereof.
Figure 4:
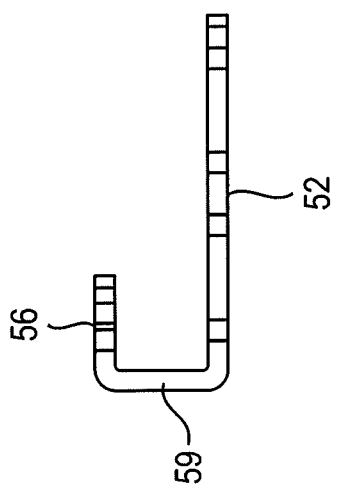
FIG. 4 is a front elevational view thereof.
Figure 6:
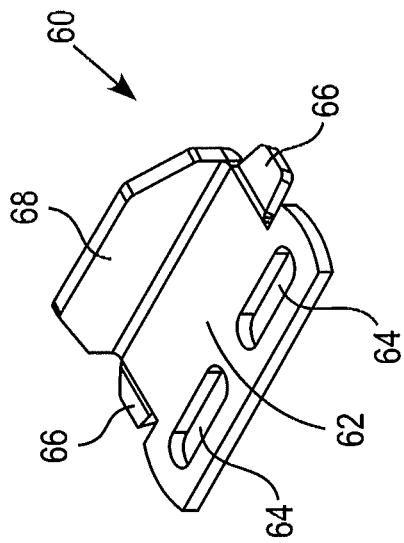
FIG. 6 is a perspective view of a hold-down clip according to the disclosure.
Figure 9:
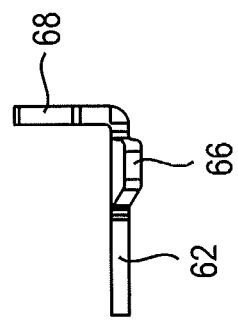
FIG. 9 is a side elevational view thereof.
Figure 7:
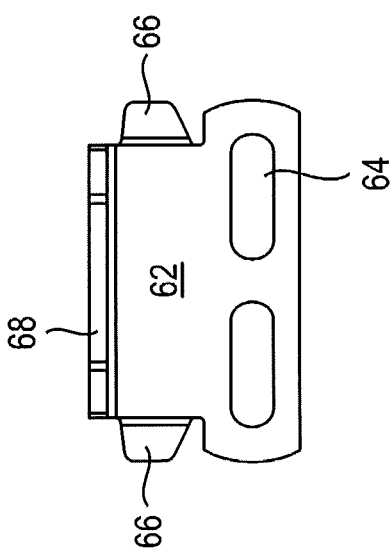
FIG. 7 is a top view thereof.
Figure 8:
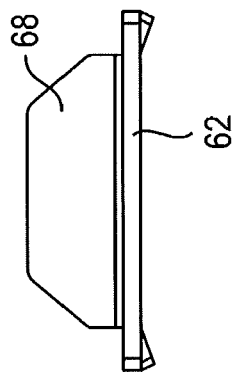
FIG. 8 is a front elevational view thereof.
Figure 10:
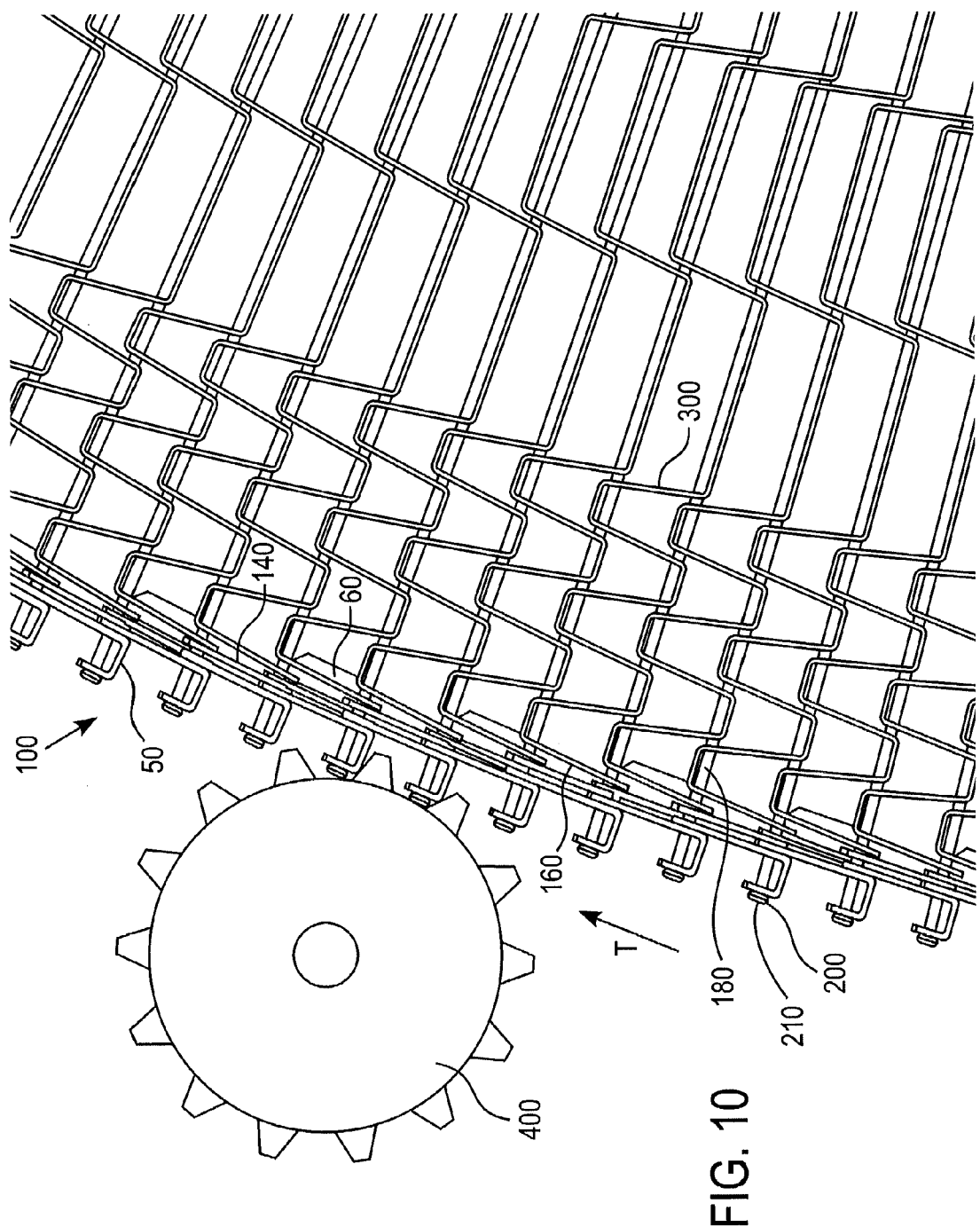
FIG. 10 is a schematic view of an assembled conveyor belt with a sprocket engaged with the edge thereof.
Figure 11:
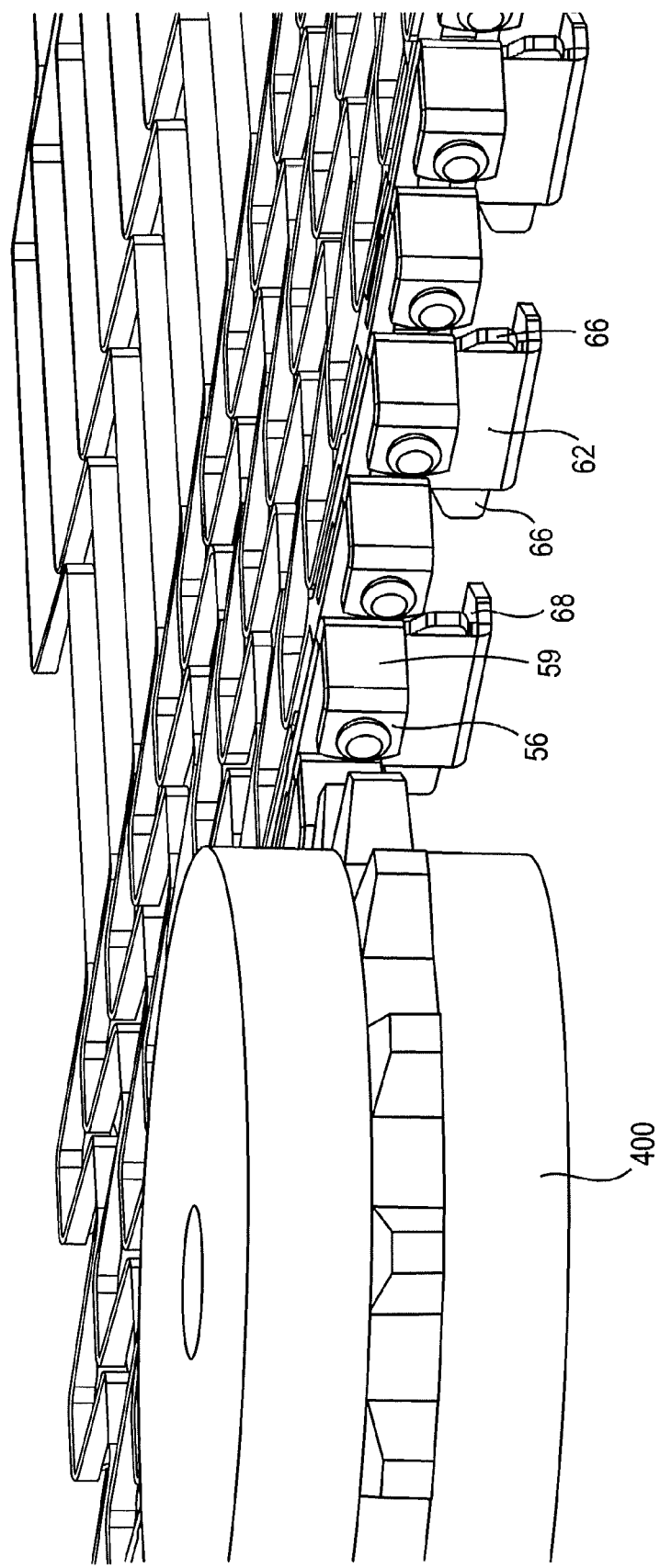
FIG. 11 is a perspective view of an assembled conveyor belt with a sprocket engaged with the edge thereof.
Figure 12:
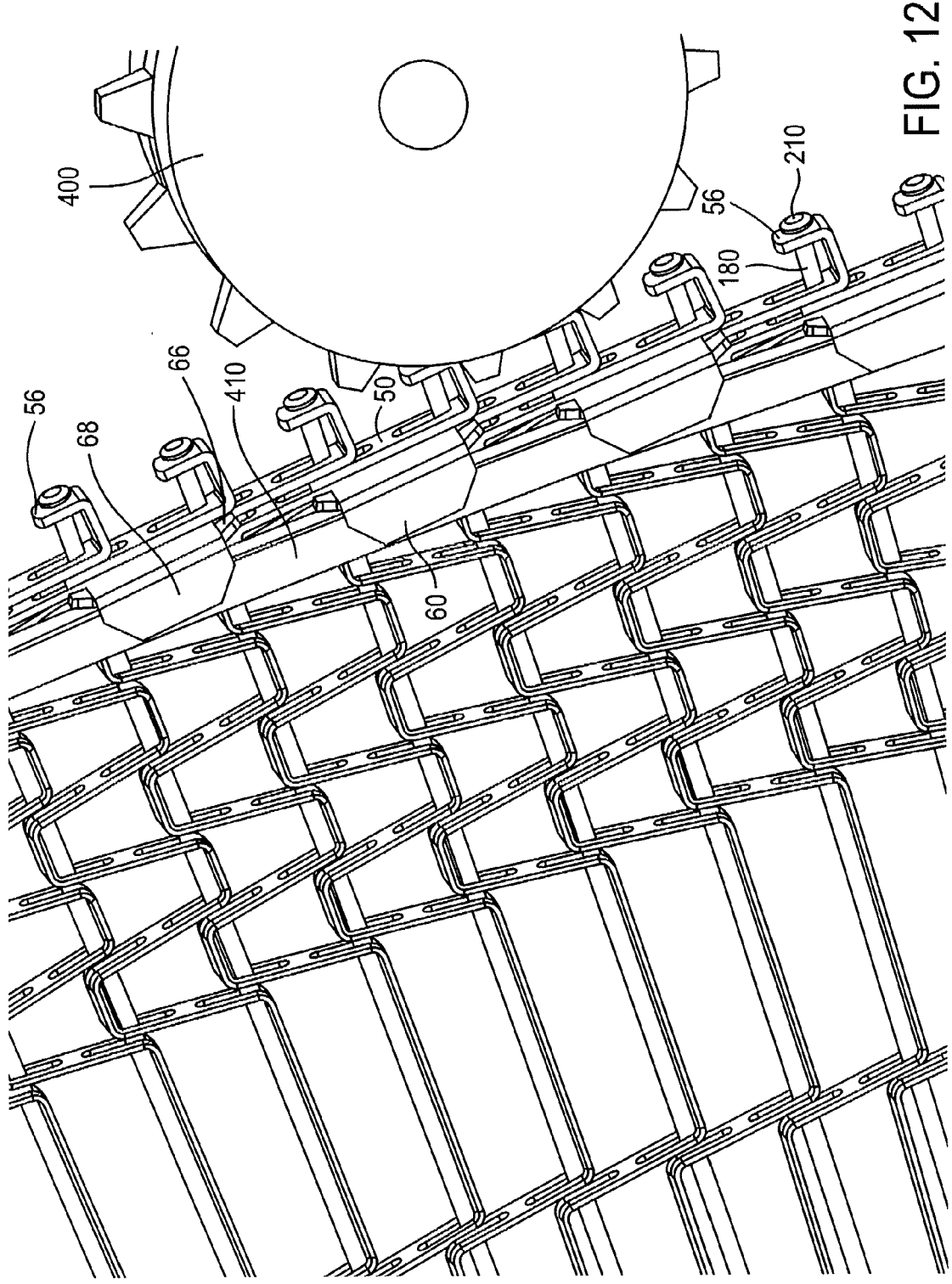
FIG. 12 is a perspective view of an assembled conveyor belt engaged with a lower support rail.
Figure 13:
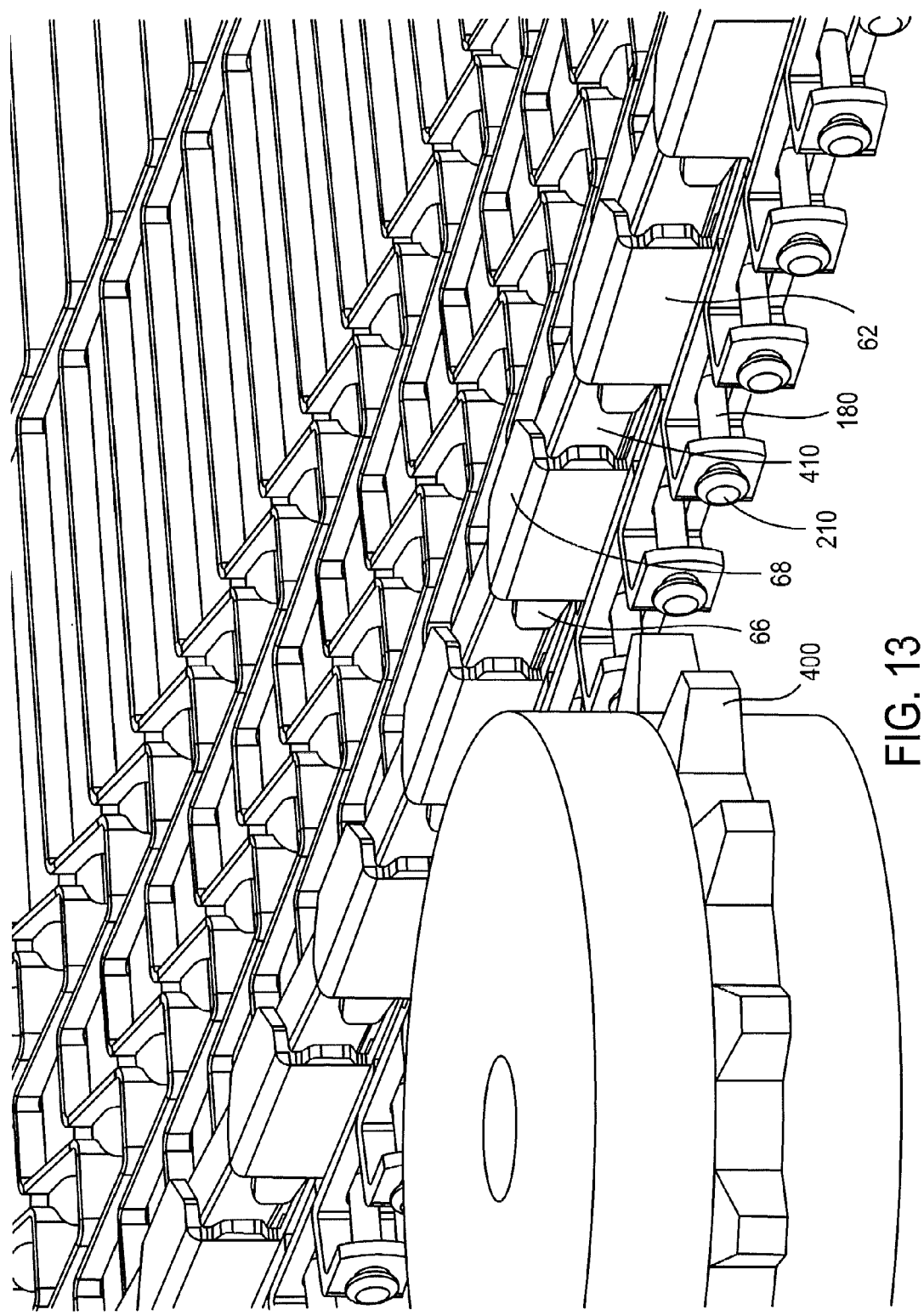
FIG. 13 is a further perspective view of an assembled conveyor belt engaged with a lower support rail.
Figure 14:
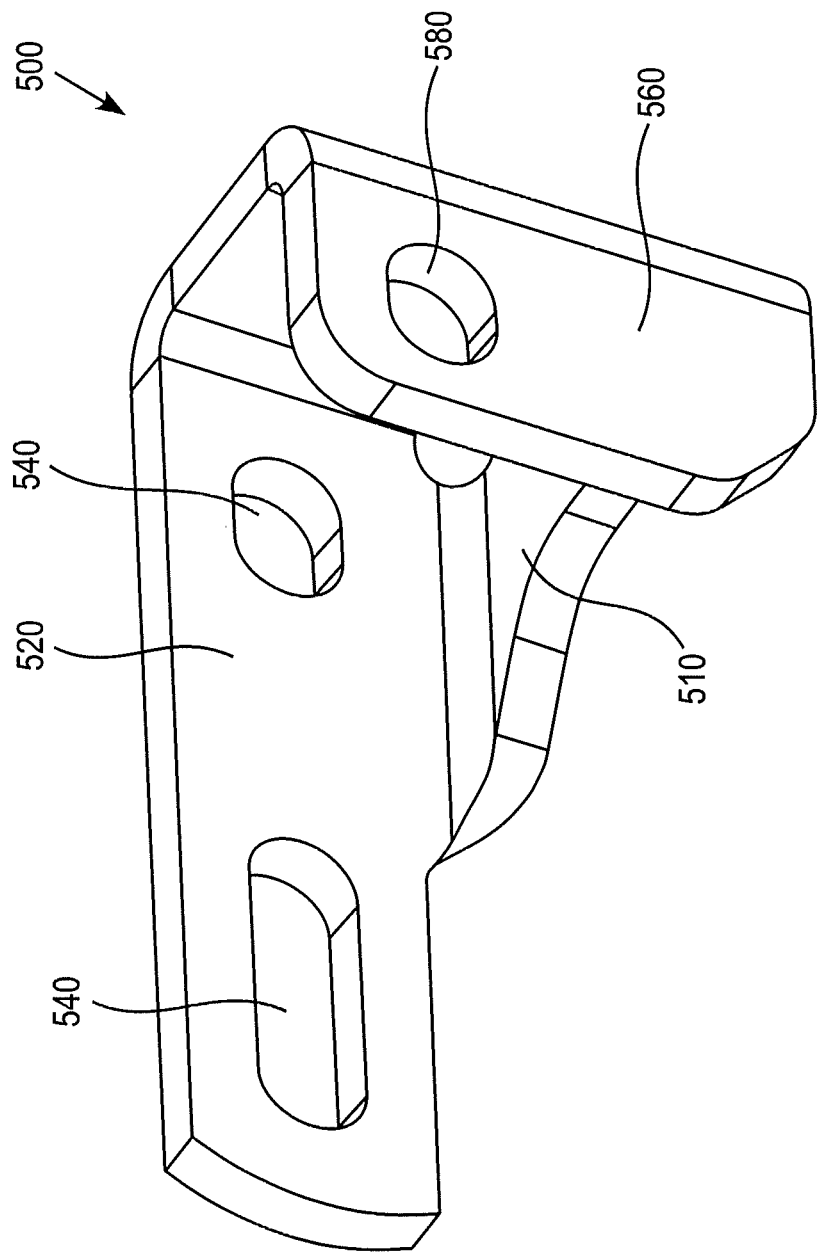
FIG. 14 is a perspective view of a belt drive clip according to a second embodiment of the disclosure.
Figure 15:
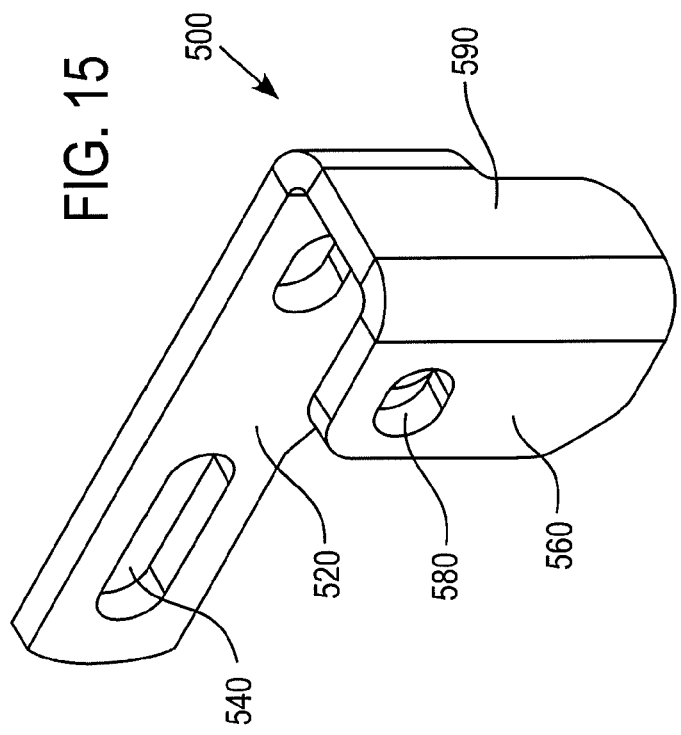
FIG. 15 is a further perspective view of a belt drive clip according to the second embodiment of the disclosure.
Figure 18:
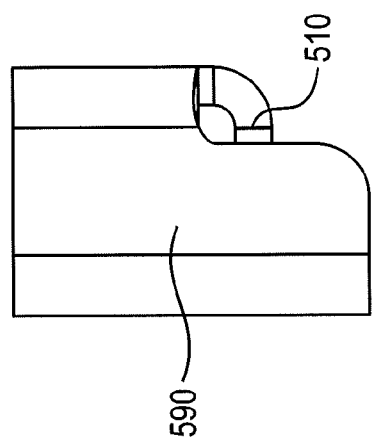
FIG. 18 is a right side elevational view thereof.
Figure 16:
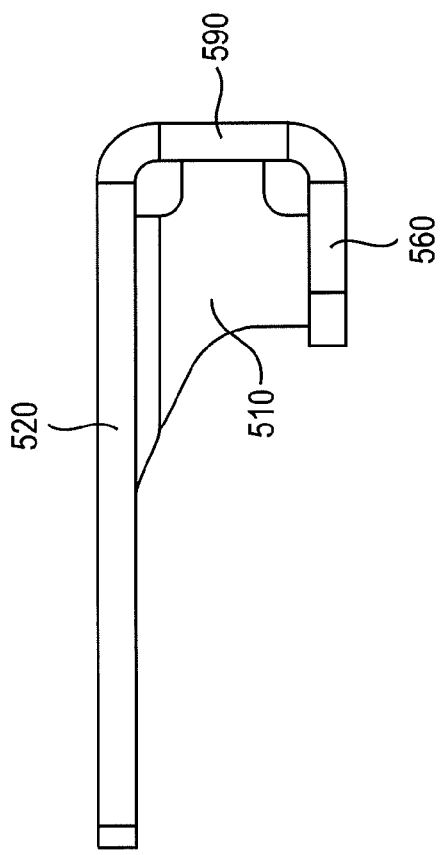
FIG. 16 is a top view thereof.
Figure 17:
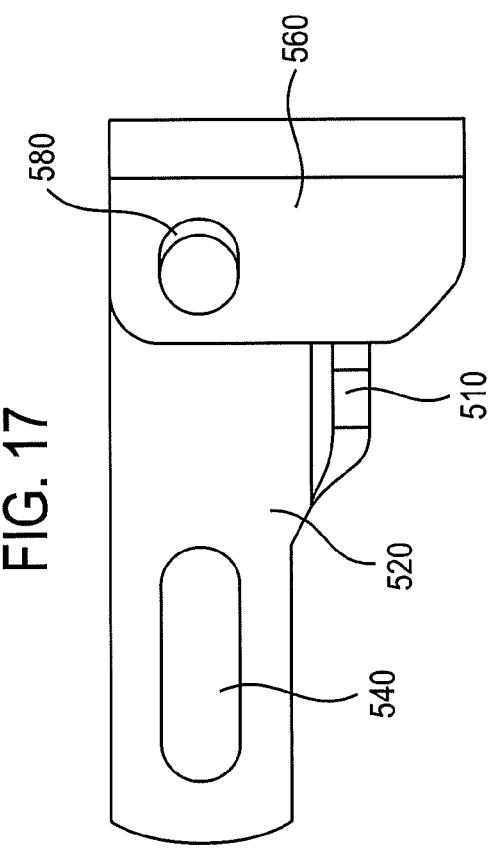
FIG. 17 is a front elevational view thereof.

A conveyor belt with improved edge configuration will be described below by reference to the embodiments disclosed here as examples and in accordance with the attached drawings.

A conveyor belt 100 constructed using a plurality of belt drive clips 50 and a plurality of hold-down clips 60, is shown in FIGS. 10-13. The belt drive clips 50 are preferably formed in a J-shape on every pitch, or wicket, and a hold-down clip 60 is preferably positioned every second pitch, or wicket, in an overlapping pattern. A standard reinforcing bar 140 is inserted into the belt 100 on those pitches, or wickets, where no hold-down clip 60 is used.

Referring to FIGS. 2-5, belt drive clip 50 includes a first leg portion 52 having two elongated slot openings 54, a second leg portion 56 having an opening 58, and a connecting portion 59 connecting the first and second leg portions 52, 56 together.

Referring to FIGS. 6-9, the hold-down clip 60 includes a base member 62 having at least one, and more preferably, two elongated slot openings 64 and opposing wing portions 66, and an upstanding member 68 disposed substantially perpendicular to the base member 62.

A conveyor belt in accordance with the present invention is shown generally in FIGS. 10-13 by reference numeral 100. Conveyor belt 100 preferably comprises a flat wire conveyor belt, although other belts configurations could of course be used. Conveyor belt 100 includes a plurality of spaced tractive rods 180 disposed in succession and transversely with respect to a direction of travel T as represented by arrow T of belt 100, each rod 180 having two ends 200 (only one being shown) preferably terminating in a buttonhead 210.

Belt 100 includes a plurality of rows of wickets 160 transversely disposed with respect to the direction of travel T, and interconnecting the succession of rods 180. Each row of wickets 160 is comprised of a plurality of links 300, each link connecting a rod 180 with a following rod in the succession. In addition, belt 100 preferably includes at least one row of J-shaped belt drive clips 50, hold-down clips 60 and reinforcing bars 140 disposed along at least one edge of the conveyor belt. Belt drive clips 50, hold-down clips 60 and reinforcing bars 140 can be positioned along one edge or on both edges of the conveyor belt depending on the desired construction and function of the particular belt. Still further, while the combined use of belt drive clips 50 and hold-down clips 60 is preferable, it is within the scope of the present disclosure that either one could be used by itself in connection with the conveyor belt. That is, the conveyor belt 100 may include only belt drive clips 50 and reinforcing bars 140 or, alternatively, only hold-down clips 60 and reinforcing bars 140. Still further, belt 100 may be manufactured without any reinforcing bars or alternatively, several rows of reinforcing bars may be provided, depending upon the particular application. Thus, it should be apparent to one skilled in the art, that any combination of belt drive clips, hold-down clips and/or reinforcing bars may be used depending upon the particular application for which the conveyor belt is intended.

As illustrated in FIGS. 10-13, the J-shaped drive clips 50 are engaged by a sprocket 400 driven by a vertically-oriented shaft of a spindle drive (not shown), while the hold-down clips 60 serve to maintain the belt 100 in proper orientation both laterally and vertically relative to the sprocket 400. The upstanding member 68 of the hold-down clip 60 as it extends below the thickness of the belt 100 is typically positioned against a stationary rail 410 (FIG. 12) and supports the reaction loading on the belt 100 as a result of engagement with the sprocket 400. The opposing wings 66 on each side of the hold-down clip 60 are provided to ensure a smooth engagement with the stationary rail 410 regardless of the driven direction of the belt 100. Further, each wing 66 is preferably tapered so as not to interfere with the normal articulation of the belt 100 as it wraps around a sprocket or similarly sized roller. The base member 62 of the hold-down clip 60 restrains the belt 100 from any tendencies to lift-up or otherwise rise out of position. Both the belt drive clip 50 and the hold-down clip 60 are positioned in an overlapping pattern along with additional reinforcing bars 140 to act as load carrying members, especially during those times when the belt 100 is partially collapsed, as in a turn for example.

The belt drive clip 50 is further retained and strengthened by the extension of the connecting rod 180 and welded outer buttonhead 210 through the second leg 56 portion of the J-shaped clip (but buttonhead 210 is not welded to leg 56). The connecting rod 180 as positioned in the illustrated construction not only simplifies the assembly and finishing of the conveyor belt, but also helps the drive clip 50 resist fatigue caused by cyclic loading due to frequent engagement with the sprocket 400 on the belt edge. Hence, the drive clip 50 improves the positive edge drive capability of the belt 100.

Referring to FIGS. 14-18, belt drive clip 500 according to a second embodiment of the disclosure includes a first leg portion 520 having two elongated slot openings 540, a second leg portion 560 having an opening 580, and a side connecting portion 590 connecting the first and second leg portions 520, 560 together. Belt drive clip 500 further includes a bottom connecting portion 510.

Figure 19:
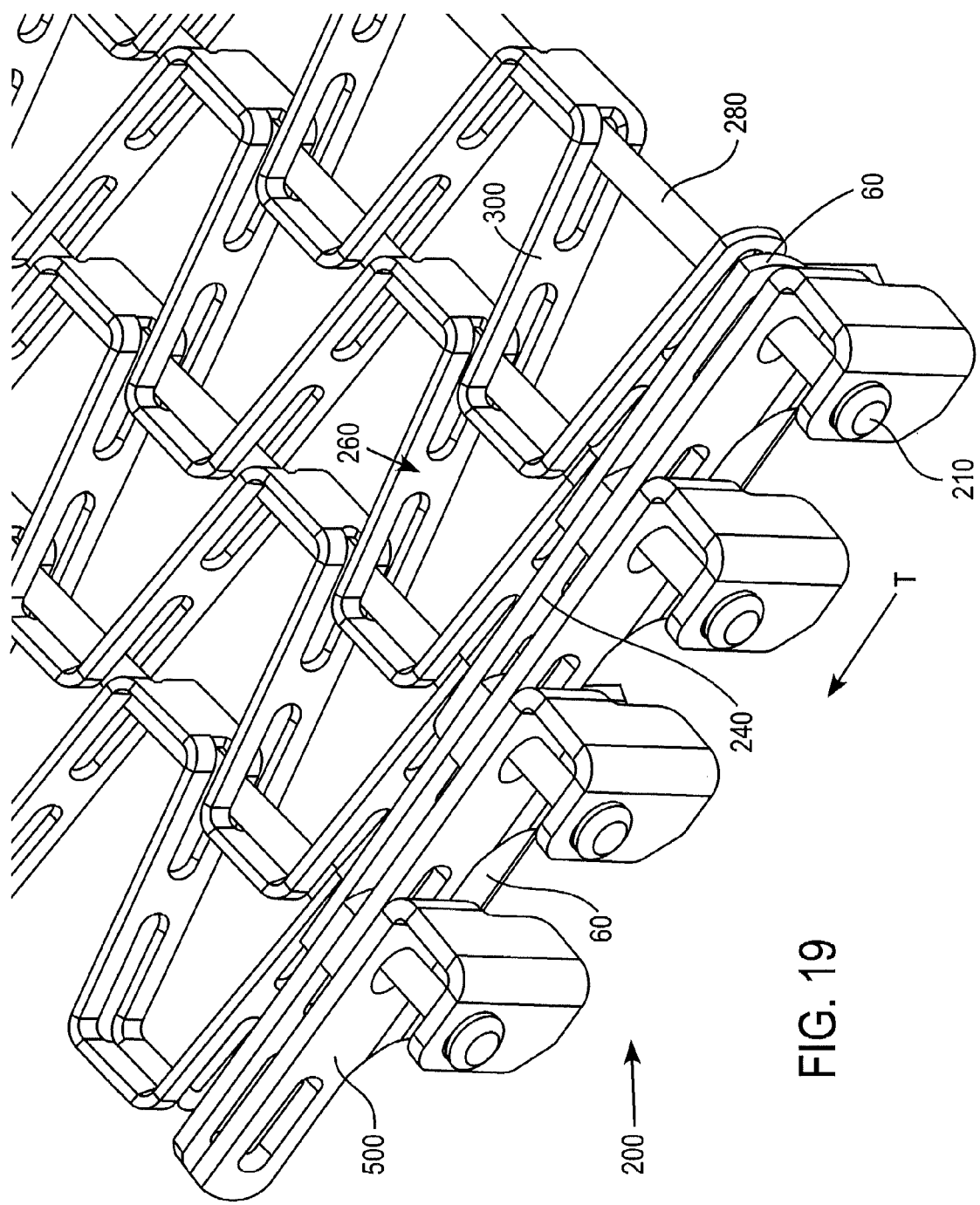
FIG. 19 is a perspective view of an assembled conveyor belt including the belt drive clip shown in FIG. 14.
Figure 20:
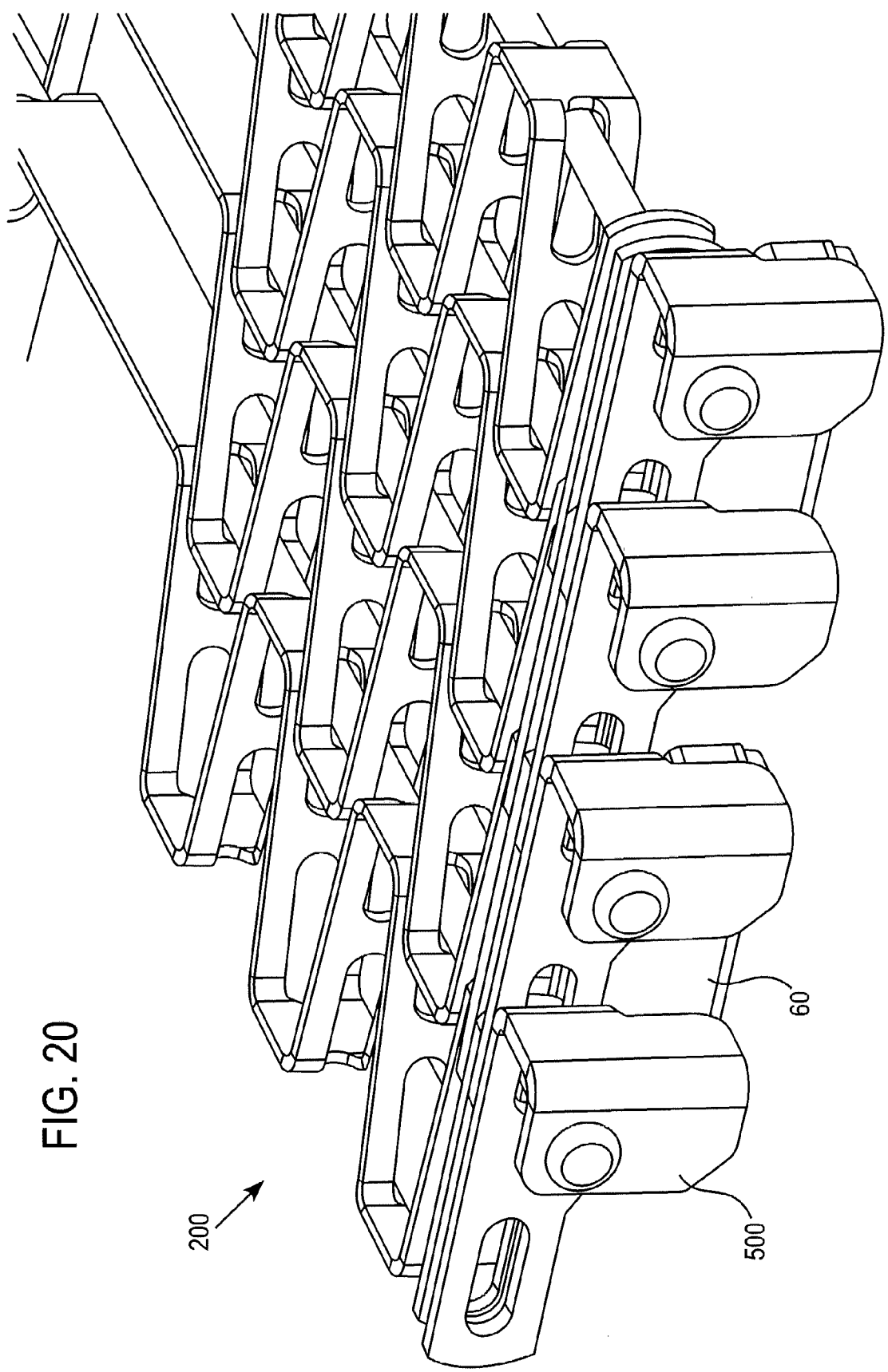
FIG. 20 is a further perspective view of an assembled conveyor belt including the belt drive clip shown in FIG. 14.

A conveyor belt in accordance with the second embodiment is shown generally in FIGS. 19-20 by reference numeral 200. Conveyor belt 200 preferably comprises a flat wire conveyor belt, although other belts configurations could of course be used. Conveyor belt 200 includes a plurality of spaced tractive rods 280 disposed in succession and transversely with respect to a direction of travel T as represented by arrow T of belt 200, each rod 280 having two ends (only one being shown) preferably terminating in a buttonhead 210.

Belt 200 includes a plurality of rows of wickets 260 transversely disposed with respect to the direction of travel T, and interconnecting the succession of rods 280. Each row of wickets 260 is comprised of a plurality of links 300, each link connecting a rod 280 with a following rod in the succession. In addition, belt 200 preferably includes at least one row of J-shaped belt drive clips 500 and reinforcing bars 240 disposed along at least one edge of the conveyor belt. Belt drive clips 500 and reinforcing bars 240 can be positioned along one edge or on both edges of the conveyor belt depending on the desired construction and function of the particular belt. A hold-down clip 60, as described above for conveyor belt 100, is preferably positioned every second pitch, or wicket, in an overlapping pattern and a reinforcing bar 240 is inserted into the belt 200 on those pitches, or wickets, where no hold-down clip 60 is used, but other configurations are of course also possible. In the following descriptions of the various embodiments disclosed herein, it is understood that like reference numerals are used to describe the same elements throughout.

As shown, the belt drive clip 500 is retained and strengthened by the extension of the connecting rod 280 and welded outer buttonhead 210 through the second leg portion 560 of the J-shaped clip (but buttonhead 210 is not welded to leg 560). The connecting rod 280 as positioned in the illustrated construction not only simplifies the assembly and finishing of the conveyor belt, but also helps the drive clip 500 resist fatigue caused by cyclic loading due to frequent engagement with the sprocket (not shown) on the belt edge. Hence, the drive clip 500 improves the positive edge drive capability of the belt 200.

Figure 21:
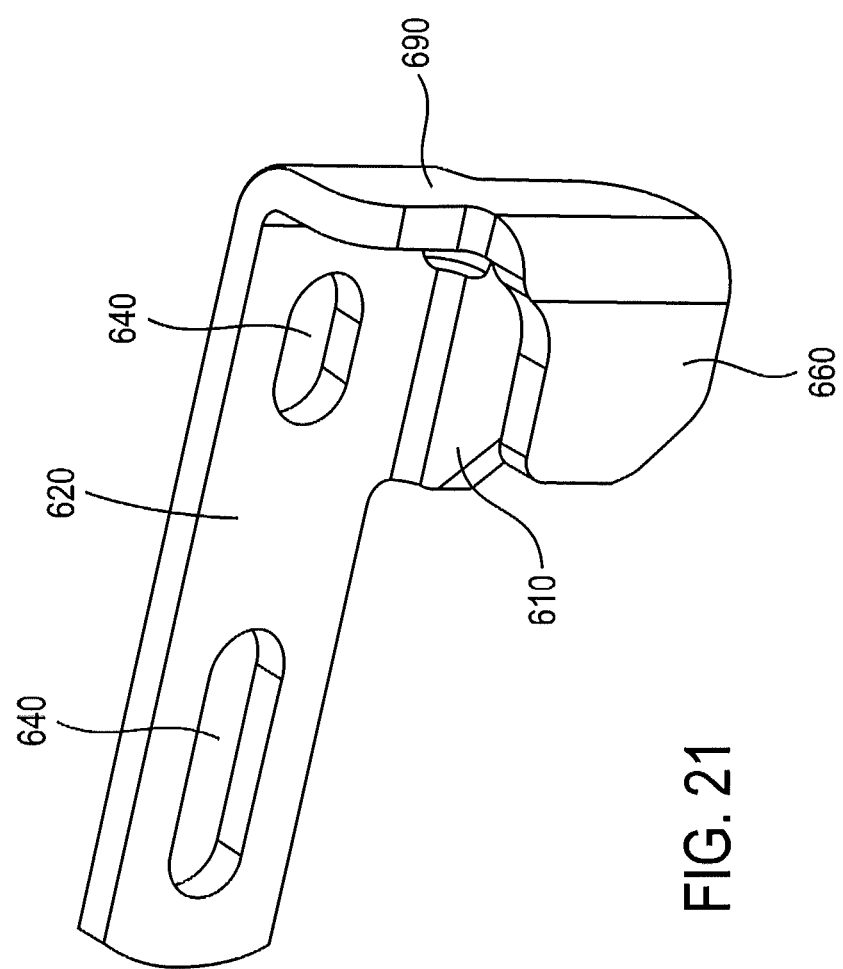
FIG. 21 is a perspective view of a belt drive clip according to a third embodiment of the disclosure.
Figure 22:
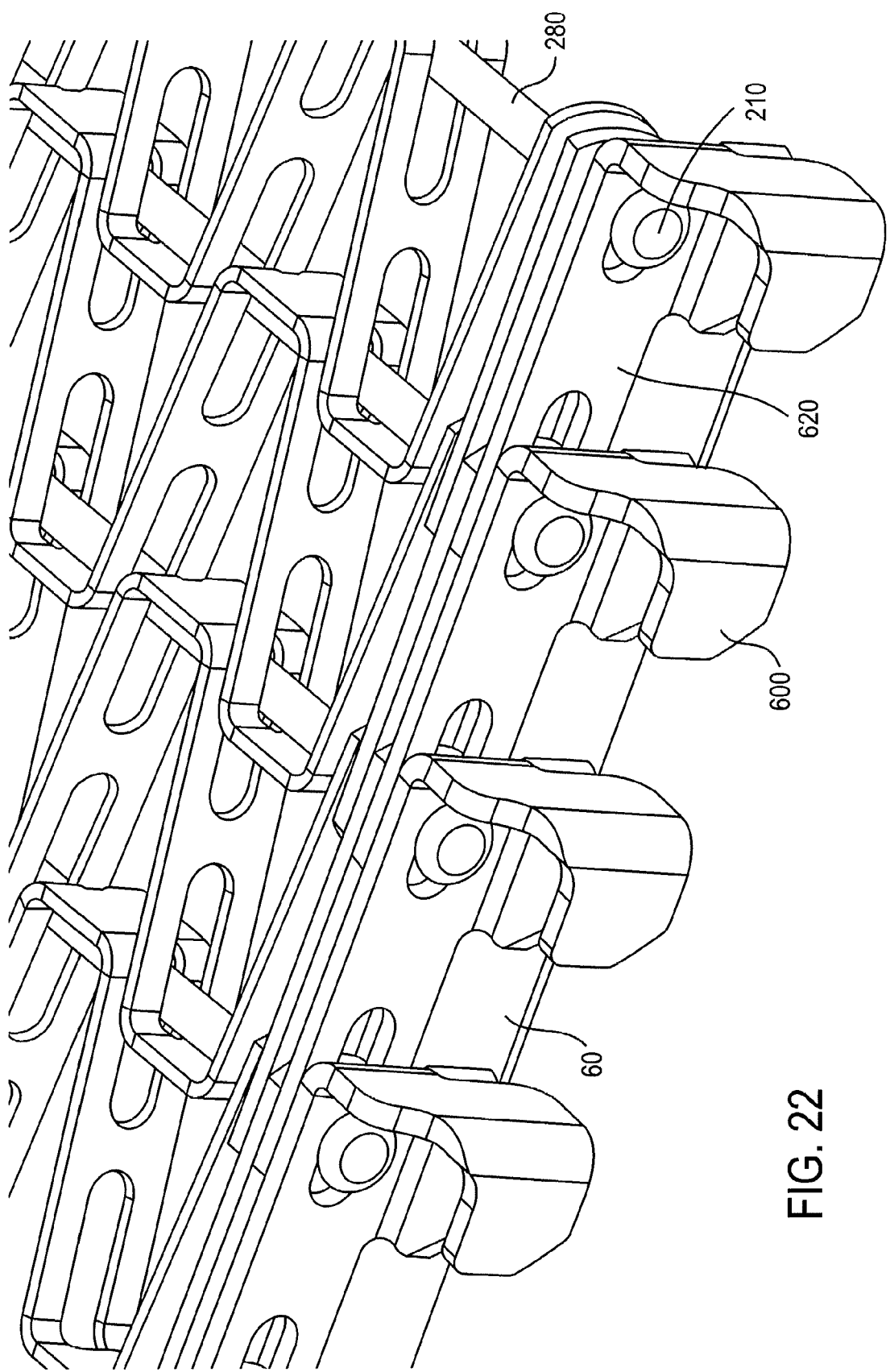
FIG. 22 is a perspective view of an assembled conveyor belt including the belt drive clip shown in FIG. 21.

Referring to FIG. 21, belt drive clip 600 according to a third embodiment includes a first leg portion 620 having two elongated slot openings 640, a second leg portion 660, and a side connecting portion 690 connecting the first and second leg portions 620, 660 together. Belt drive clip 600 further includes a bottom connecting portion 610. Unlike the first and second embodiments, belt drive clip 600 does not include an opening in the second leg portion 660 for receiving the connecting rod but rather, the corner portion of belt drive clip 600 between second leg portion 660 and side connecting portion 690 is notched out. Hence, referring also to FIG. 22, each rod 280 terminates in a buttonhead 210 disposed against an inside portion of belt drive clip 600, i.e., against an inner surface of first leg portion 620, rather than against an outer surface of the second leg portion.

Figure 23:
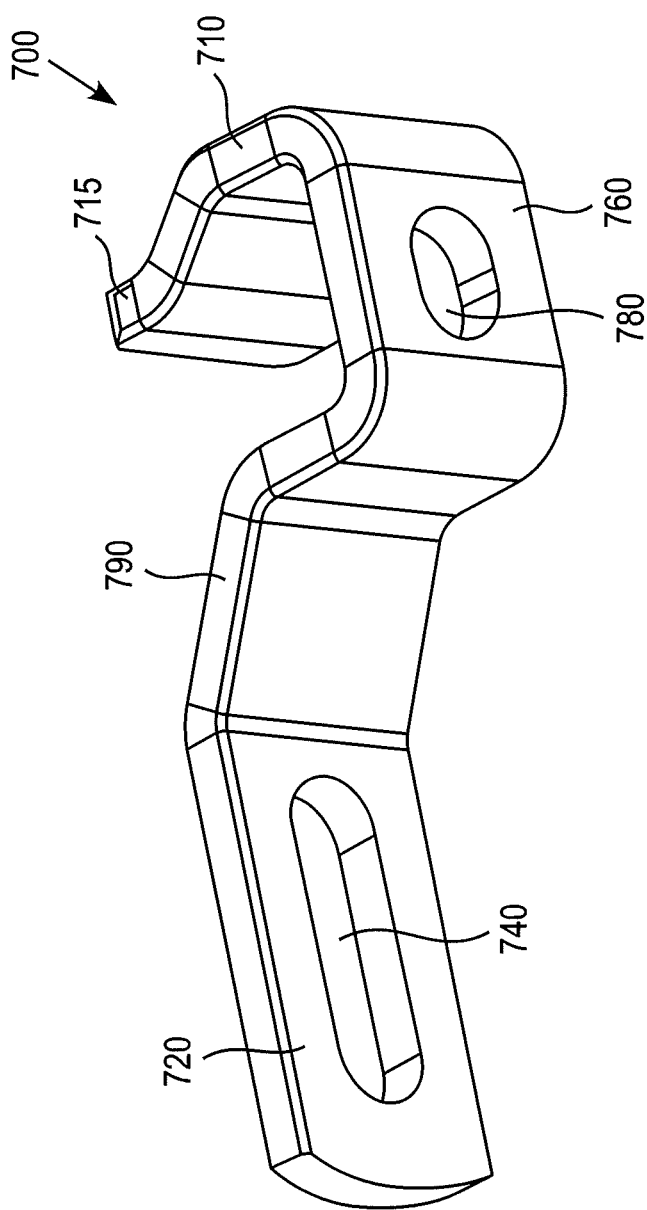
FIG. 23 is a perspective view of a belt drive clip according to a fourth embodiment of the disclosure.
Figure 24:
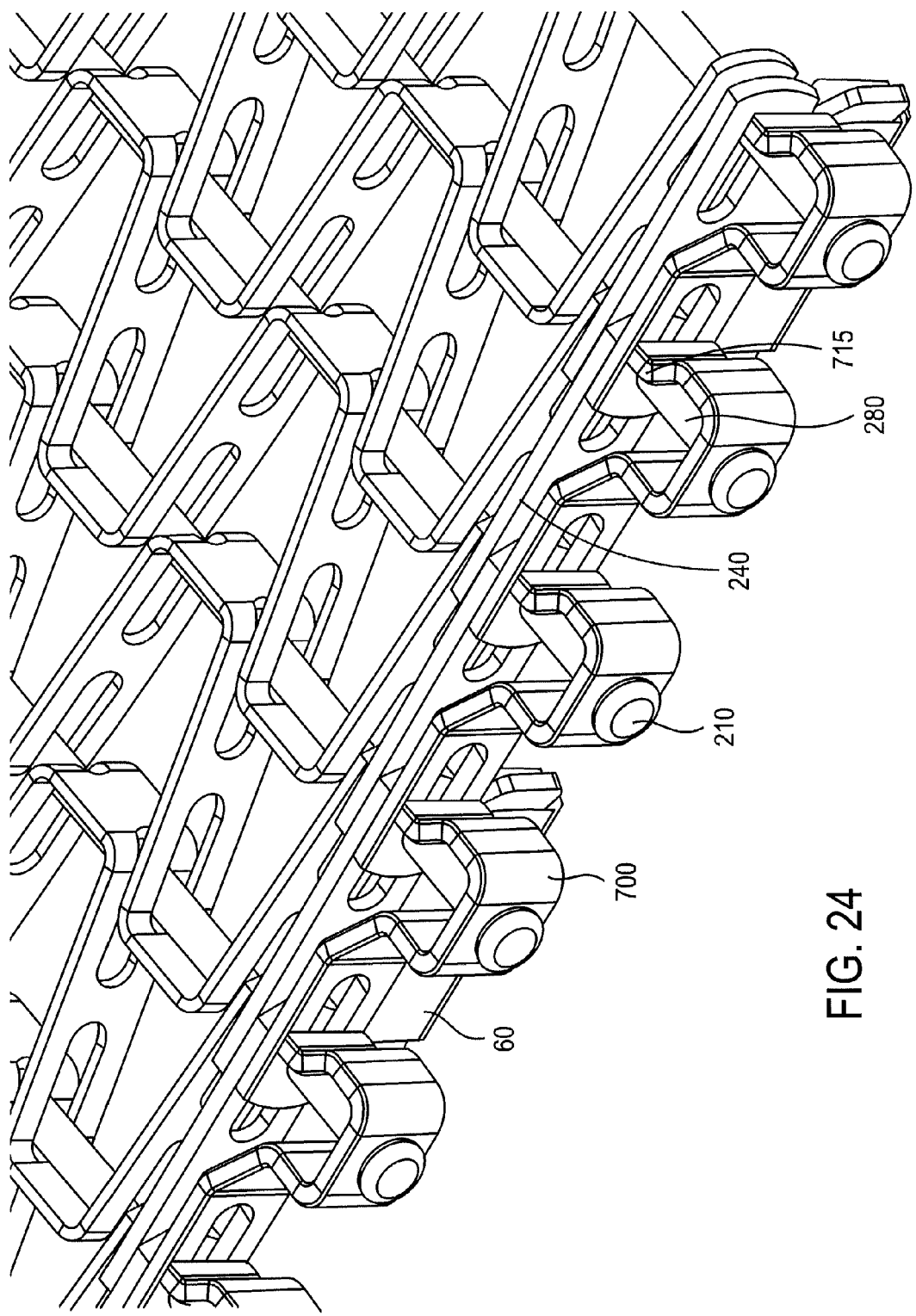
FIG. 24 is a perspective view of an assembled conveyor belt including the belt drive clip shown in FIG. 23.

Referring to FIGS. 23-24, belt drive clip 700 according to a fourth embodiment includes a first leg portion 720 having an elongated slot opening 740, a second leg portion 760 having an opening 780, and an angular connecting portion 790 connecting the first and second leg portions 720, 760 together. Belt drive clip 700 further includes a side portion 710.

As shown, the belt drive clip 700 is retained and strengthened by the extension of the connecting rod 280 and welded outer buttonhead 210 through the second leg portion 760. An end portion 715 of the second leg portion 760 abuts against the connecting rod 280 to provide further stabilization of the same. Belt drive clip 700 is more simplistic than the second embodiment shown in FIGS. 14-18 and is also left and right belt edge reversible.

Figure 25:
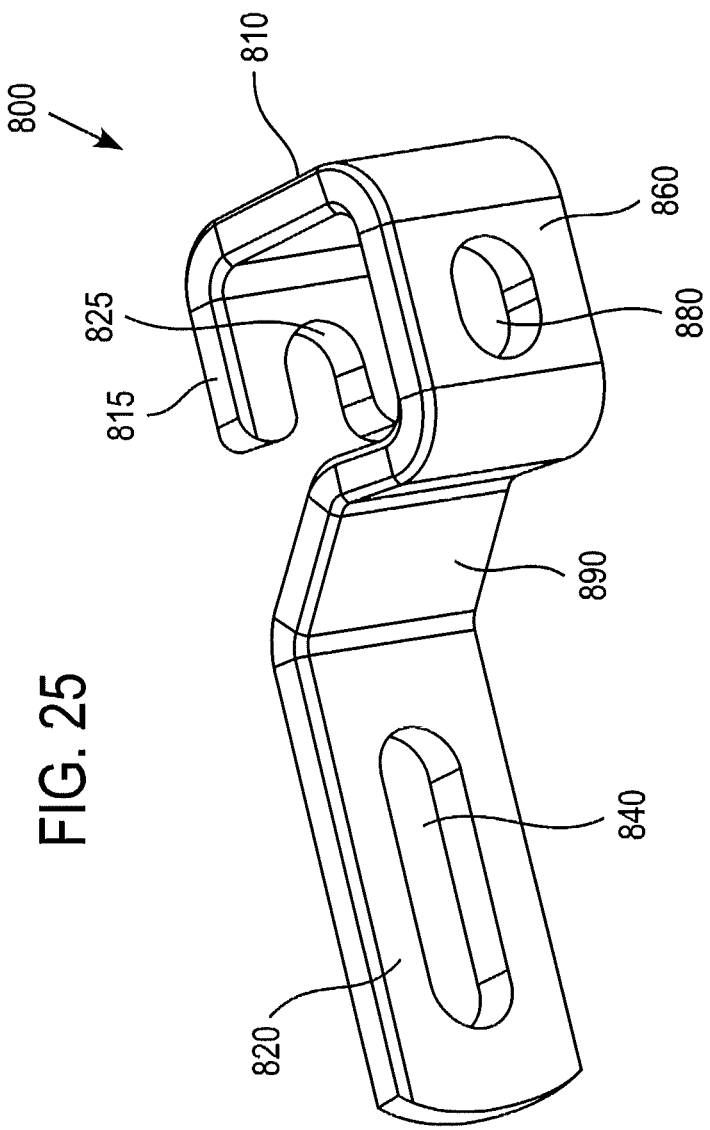
FIG. 25 is a perspective view of a belt drive clip according to a fifth embodiment of the disclosure.
Figure 26:
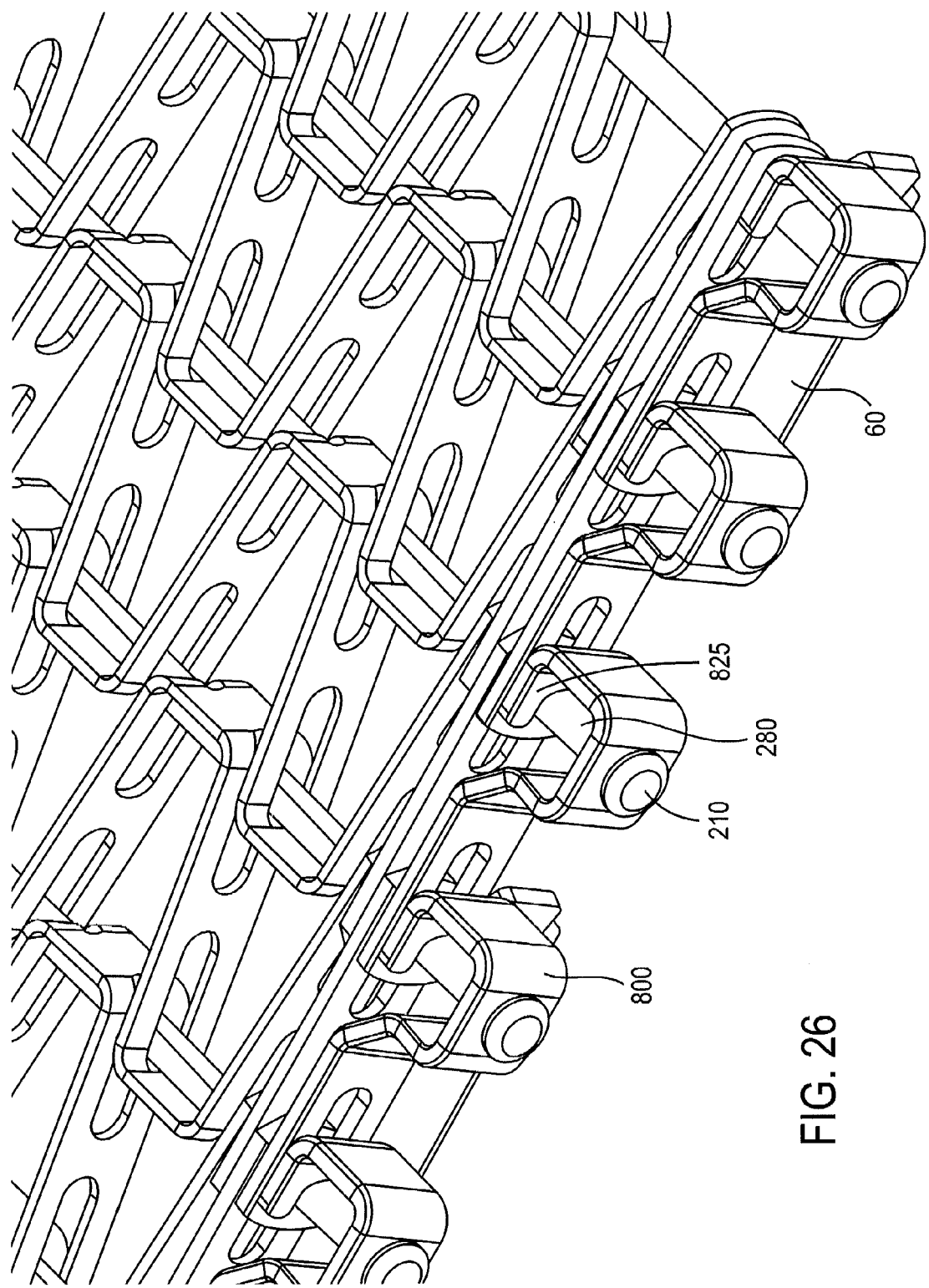
FIG. 26 is a perspective view of an assembled conveyor belt including the belt drive clip shown in FIG. 25.

Referring to FIGS. 25-26, belt drive clip 800 according to a fifth embodiment includes a first leg portion 820 having an elongated slot opening 840, a second leg portion 860 having an opening 880, and an angular connecting portion 890 connecting the first and second leg portions 820, 860 together. Belt drive clip 800 further includes a rear leg portion 815 and a side portion 810 connecting the rear leg portion 815 to the second leg portion 860.

As shown, the belt drive clip 800 is retained and strengthened by the extension of the connecting rod 280 and welded outer buttonhead 210 through the second leg portion 860. As shown, rear leg portion 815 defines an inner leg of the clip 800 and second let portion 860 defines an outer leg of the clip against which the buttonhead 210 abuts. Rear leg portion 815 also includes a notch 825 against which the connecting rod 280 abuts to provide further stabilization of the same. During use, a force applied to drive clips 800 from a drive sprocket (not shown) is transferred to connecting rods 280, and consequently the belt assembly, at or near a point where the connecting rod 280 is in shear due to the presence of reinforcing bars 240 on the edge of the belt. Similar to above, belt drive clip 800 is also left and right belt edge reversible.

Figure 27:
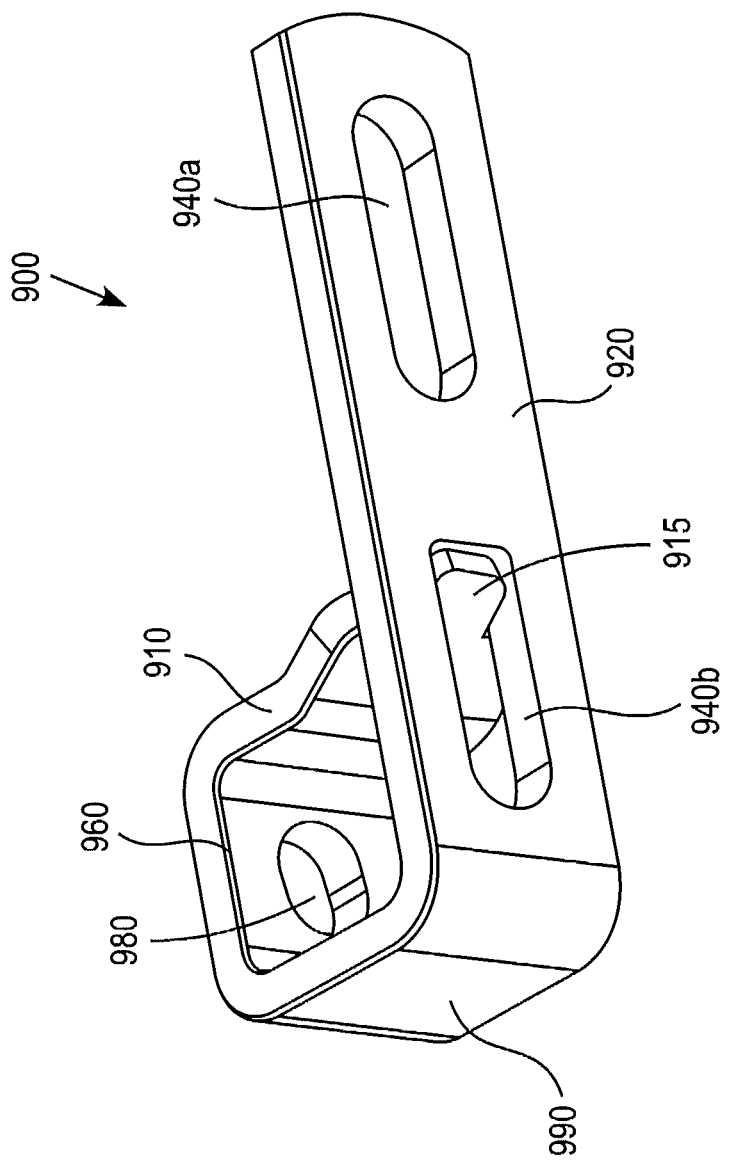
FIG. 27 is a perspective view of a belt drive clip according to a sixth embodiment of the disclosure.

Referring to FIG. 27, belt drive clip 900 according to a sixth embodiment includes a first leg portion 920 having two elongated slot openings 940*a*, 940*b*, a second leg portion 960 having an opening 980, and a first side or connecting portion 990 connecting the first and second leg portions 920, 960 together. Belt drive clip 900 further includes a second side portion 910 extending from the second leg portion 960. The second side portion 910 includes a terminal end 915 configured to be received within the slot opening 940*b*. Similar to above, belt drive clip 900 is also left and right belt edge reversible.

Still further, while the combined use of the various embodiments of the belt drive clips and hold-down clips is preferable, it is within the scope of the disclosure that either one could be used by itself in connection with the conveyor belt. That is, the conveyor belt may include only belt drive clips and reinforcing bars or, alternatively, only hold-down clips and reinforcing bars. Still further, the belt may be manufactured without any reinforcing bars or alternatively, several rows of reinforcing bars may be provided, depending upon the particular application. Thus, it should be apparent to one skilled in the art, that any combination of belt drive clips, hold-down clips and/or reinforcing bars may be used depending upon the particular application for which the conveyor belt is intended.

While the present invention has been described with respect to a particular embodiment of the present invention, this is by way of illustration for purposes of disclosure rather than to confine the invention to any specific arrangement as there are various alterations, changes, deviations, eliminations, substitutions, omissions and departures which may be made in the particular embodiment shown and described without departing from the scope of the claims.

What is claimed is:
1. A flat wire conveyor belt comprising:
   a plurality of spaced tractive rods;
   a plurality of rows of flat wire wickets transversely disposed with respect to a direction of travel and interconnecting said plurality of spaced tractive rods;
   a plurality of reinforcing bars;
   a plurality of belt drive clips, each of said plurality of belt clips being generally J-shaped with a first leg portion, a second leg portion, and a connecting portion, the first and second leg portions defining two substantially parallel planes and the connecting portion defining a plane intersecting the two substantially parallel planes, each of said plurality of belt clips having at least one opening in the first leg portion or the second leg portion and no openings in the connecting portion, the openings of each belt drive clip existing entirely in the planes of the first and second leg portions; and
   a plurality of belt hold-down clips;
   wherein said conveyor belt includes opposing first and second outer edges and said plurality of reinforcing bars, belt drive clips and belt hold-down clips are disposed on at least one of the first and second outer edges of the flat wire conveyor belt such that said reinforcing bars, belt drive clips and belt hold-down clips improve the edge drive capability of said conveyor belt; and
   wherein each of said plurality of belt hold-down clips includes a base member having at least one opening and an upstanding member disposed substantially perpendicular to said base member, each of said plurality of belt hold-down clips further including opposing wing portions extending from opposing sides of said base member.
2. The flat wire conveyor belt according to claim 1, wherein the first leg portion has two openings, the second leg portion has one opening, and the connecting portion connects the first and second leg portions.

3. The flat wire conveyor belt according to claim 2, wherein each of said plurality of belt drive clips further includes a bottom connecting portion connecting the first and second leg portions.

4. The flat wire conveyor belt according to claim 1, wherein the first leg portion has two openings, the connecting portion being a side connecting portion connecting the first and second leg portions, and a bottom connecting portion connecting the first and second leg portions.

5. The flat wire conveyor belt according to claim 4, wherein a corner portion defined between the side connection portion and the bottom connecting portion is notched out.

6. The flat wire conveyor belt according to claim 1, wherein the first leg portion has an opening, the second leg portion has an opening, and the connecting portion being an angular connecting portion connecting the first and second leg portions.

7. The flat wire conveyor belt according to claim 6, wherein each of said plurality of belt drive clips further includes a rear leg portion generally parallel to the second leg portion, and the connecting portion being a side portion connecting the rear leg portion to the second leg portion.

8. The flat wire conveyor belt according to claim 2, wherein each of said plurality of belt drive clips further includes a side portion extending from said second leg portion, said side portion including a terminal end configured to be received within one of said two openings in said first leg portion.

9. A flat wire conveyor belt with improved edge drive capability, said conveyor belt comprising:
a plurality of spaced tractive rods;
a plurality of rows of flat wire wickets transversely disposed with respect to a direction of travel and interconnecting said plurality of spaced tractive rods;
a plurality of belt drive clips, each of said plurality of belt clips being generally J-shaped with a first leg portion, a second leg portion, and a connecting portion, the first and second leg portions defining substantially parallel planes and the connecting portion defining a plane intersecting the two parallel planes, each of said plurality of belt clips having at least one opening in the first leg portion or the second leg portion and the connecting portion having no openings; and
a plurality of belt hold-down clips, wherein each of said plurality of belt hold-down clips includes a base member having at least one opening and an upstanding member disposed substantially perpendicular to said base member, each of said plurality of belt hold-down clips further including opposing wing portions extending from opposing sides of said base member;
wherein said conveyor belt includes opposing first and second outer edges and said plurality of belt drive clips are disposed on at least one of the first and second outer edges of the flat wire conveyor belt.

10. The flat wire conveyor belt according to claim 9, wherein the first leg portion has two openings, the second leg portion has one opening, and the connecting portion connects the first and second leg portions.

11. The flat wire conveyor belt according to claim 10, wherein each of said plurality of belt drive clips further includes a bottom connecting portion connecting the first and second leg portions.

12. The flat wire conveyor belt according to claim 9, wherein the first leg portion has two openings, the connecting portion being a side connecting portion connecting the first and second leg portions and a bottom connecting portion connecting the first and second leg portions.

13. The flat wire conveyor belt according to claim 12, wherein a corner portion defined between the side connection portion and the bottom connecting portion is notched out.

14. The flat wire conveyor belt according to claim 9, wherein the first leg portion has an opening, the second leg portion has an opening, and the connecting portion being an angular connecting portion connecting the first and second leg portions.

15. The flat wire conveyor belt according to claim 14, wherein each of said plurality of belt drive clips further includes a rear leg portion generally parallel to the second leg portion, and the connecting portion being a side portion connecting the rear leg portion to the second leg portion.

16. The flat wire conveyor belt according to claim 10, wherein each of said plurality of belt drive clips further includes a side portion extending from said second leg portion, said side portion including a terminal end configured to be received within one of said two openings in said first leg portion.

17. A flat wire conveyor belt with improved edge drive capability, said conveyor belt comprising:
a plurality of spaced tractive rods;
a plurality of rows of flat wire wickets transversely disposed with respect to a direction of travel and interconnecting said plurality of spaced tractive rods;
a plurality of belt drive clips and/or a plurality of belt hold-down clips;
wherein each of said plurality of belt clips are generally J-shaped with a first leg portion, a second leg portion, and a connecting portion, the first and second leg portions defining substantially parallel planes and the connecting portion defining a plane intersecting the two parallel planes, each of said plurality of belt clips having at least one opening in the first leg portion or the second leg portion, the openings of each of the belt clips existing entirely in the planes of the first and second leg portions;
wherein each of said plurality of belt hold-down clips further includes a base member having at least one opening and opposing wing portions extending from opposing sides of said base member;
wherein said conveyor belt includes opposing first and second outer edges and said plurality of belt drive clips and/or belt hold-down clips are disposed on at least one of the first and second outer edges of the flat wire conveyor belt.

* * * * *